Nov. 8, 1927.  
R. ADAMS  
1,647,977  
SELF CLOSING TONGS  
Filed Oct. 28, 1924  
2 Sheets-Sheet 2

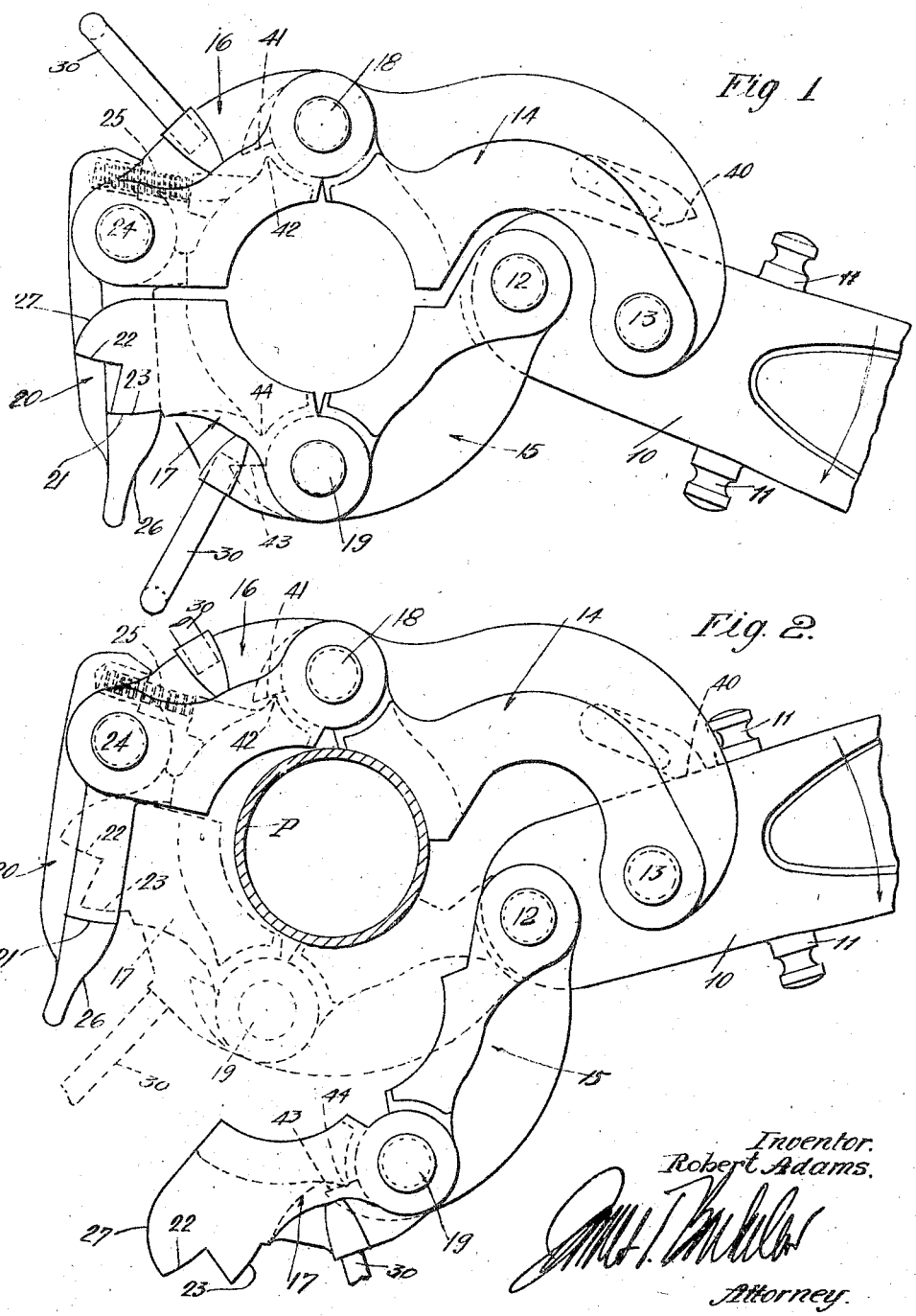

Inventor.  
Robert Adams  
Attorney.

Patented Nov. 8, 1927.

1,647,977

UNITED STATES PATENT OFFICE.

ROBERT ADAMS, OF LOS ANGELES, CALIFORNIA, ASSIGNOR TO E. C. WILSON, OF LOS ANGELES, CALIFORNIA.

SELF-CLOSING TONGS.

Application filed October 28, 1924. Serial No. 746,257.

This invention relates to tongs such as are used on pipe and other cylindrical work; and although the invention is not at all necessarily restricted to such use, I shall describe and illustrate it as used on well pipe, rotary drill pipe, and the like. In such uses the tongs are necessarily very heavily made, and are very heavy and difficult to handle; and it is a general object of this invention to provide a simple and improved arrangement whereby such tongs may be automatically closed upon a pipe with a minimum of manual operations.

In describing a preferred and typical form of my invention, I shall describe and illustrate it as applied to that specific type of tongs known to the trade as the Wilson tongs, and which is described in E. C. Wilson's patent on tongs, No. 1,561,963, granted November 17, 1925, and also his patent on pipe tongs No. 1,575,141 granted March 2, 1926. It will be understood that this specific illustration of my invention as applied to that specific type of tongs is not necessarily a limitation upon the invention, although in some of its more specific aspects the invention has features of combination with such a tongs.

In such tongs, and particularly where they are used in oil-well work under heavy stresses, and where facility and quickness of operation is very desirable, it is highly desirable to have such tongs automatically closing or self-closing so as to require on the part of the operator minimum effort and a minimum number of separate operations. Usually, in the use of such heavy tongs, it has in the past been necessary for one operator to place the tongs upon the pipe and another operator to close the tongs around the pipe, or has required of a single operator the performance of a number of awkward operations. There has later been proposed, and there has been applied to the Wilson tongs, a self-closing device that automatically closes the tongs around the pipe; and my present invention relates to improvements in such self-closing devices. While I do not claim as my invention the broad idea of automatic or self-closing of such tongs upon a pipe, my invention does comprehend a simple structure that can easily be embodied in such tongs to enable them to be placed upon and closed about the pipe by simple operation on the part of a single operator. The invention itself will be best understood from the following detailed description of a preferred form thereof as applied to the specified type of tongs, reference for these purposes being had to the accompanying drawings wherein:

Fig. 1 is a plan showing my invention applied to the tongs, this figure showing the tongs in the position closed to take a smaller sized pipe;

Fig. 2 is a similar plan showing the positions of the parts while the tongs are being placed upon and closed about such a pipe;

Figure 3:
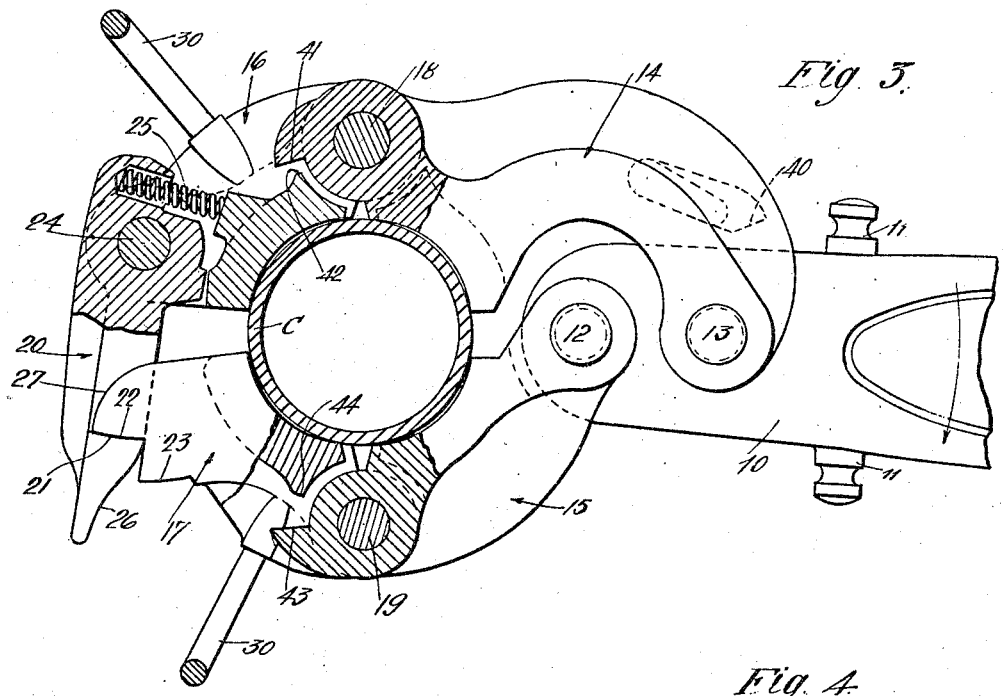
Fig. 3 is a view similar to Fig. 1 showing the tongs closed about a larger sized pipe, and showing parts in section for purposes of illustration.

In the drawings I have shown a handle 10 which may be of any convenient length, and it will be understood that tongs of this character are usually supported upon a crane or other overhead support by some attachment to the handle, the members shown at 11 being a part of such supporting attachment. Pivoted to the handle at offset pivots 12 and 13 are two pipe encircling and gripping elements which are, in this specific illustrative embodiment of my invention, each shown as being made up of two segments or jaws. Thus, two inner segments or jaws 14 and 15 are pivoted directly to the handle at pivots 13 and 12, respectively; and two outer segments or jaws 16 and 17 are pivoted at pivots 18 and 19 to the outer ends of the two inner segments 14 and 15, respectively. Swinging of handle 10, as will be well understood, causes those segments to constrict around a pipe or to back off and loosen around a pipe, the handle being moved in the direction indicated by the arrow in the various views to constrict the segments about a pipe, and being moved in the opposite direction to back off the segments or loosen them about a pipe.

One of the outer segments as 16 carries at its outer end a pivoted latch member 20 which latch member has a latching shoulder 21 adapted to drop over and contact with either of a plurality of lug shoulders, which in this case are shown as two in number, 22 and 23, spaced apart from each other in a direction generally circumferential of the tongs or pipe, and spaced by a distance suitable to adapt the tongs to different sizes of pipe, or for instance, to a given size of pipe and to its collar. Latch 20 swings on a pivot 24, and is pressed by spring 25 so that it is always urged inwardly against the latch lug; and the inner face 26 of the latch head is so formed that it will ride out over the back surfaces 27 of the latch lug as the tongs are closed about a pipe. The two outer segments 16 and 17 may both be provided with handles 30 for closing the segments about a pipe by hand, although only the handle on segment 17 is used when operating the tongs according to my invention.

It will be readily understood from a consideration of the drawings how the latch will automatically engage when the segments are closed about a pipe, and how the latch will engage selectively with either shoulder 22 or shoulder 23, depending upon the size of the pipe being closed upon.

Figure 4:
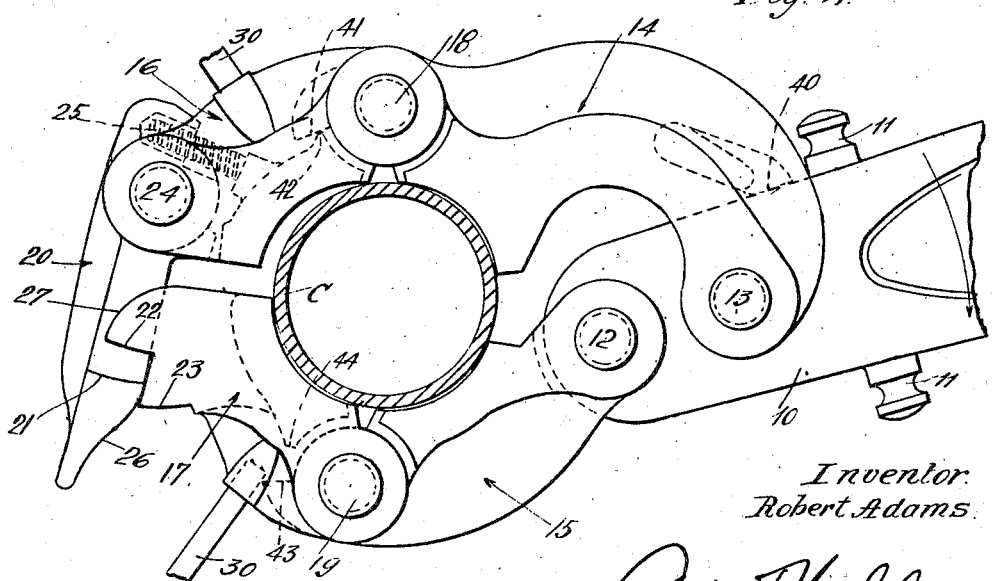
Fig. 4 is a view illustrating the action as the parts are closed about such larger sized pipe.

My arrangement for closing the tongs about a pipe comprises a means which holds the whole of one pipe encircling element substantially up to the pipe while the other element is closed on the pipe; or, more specifically, in this particular type of tongs, holds all the pivoted segments or jaws of one element up against the pipe; or, also more specifically, this is done by a manipulation of the handle. In the type of tongs here shown where each element comprises two pivoted segments, I provide means for holding both segments of one element substantially up to position against the pipe. Segment 14 has a stop shoulder 40 that is adapted to contact with handle 10, when the handle is thrown to such a position as shown in Figs. 2 and 4. Segment 14 also carries a stop shoulder 41 with which a part 42 of segment 16 is adapted to contact when segment 16 is in the position either of Fig. 2 or Fig. 4. The other two segments need no stop but it is preferred to provide segment 15 with a stop shoulder 43 to be contacted by part 44 of segment 17 when segment 17 is thrown out to open position, so as to cause segment 15 also to open, with the result that one side of the tongs are thus opened up wide for easy insertion of the pipe. This arrangement is particularly desirable here because, as will be noted, the action of stops 40 and 41, 42 prevents jaws 14 and 16 from being thrown back to open the tongs widely.

Suppose now the tongs are to be applied to a smaller sized pipe P as shown in Fig. 2. The side including segments 15 and 17 is opened up to the position shown in the full lines and the operator with one hand on handle 10 moves the other segments up to and against the pipe, and at the same time throws handle 10 around, in the direction opposite to that indicated by the arrow, against stop 40. In this position the operator moves the tongs up to the pipe until segments 16 and 14 are against it, or preferably until segment 14 bears against the pipe as shown in Fig. 2.

In this position of the handle against stop 40, the operator can easily hold segment 14 against the pipe and keep it from swinging around away from the pipe; while segment 16 is kept from backing away from the pipe except to a limited distance as shown in Fig. 2 by the action of stops 41, 42. As the operator performs these operations with one hand on the handle, he grasps handle 30 of segment 17 in the other hand, and closes it from the position shown in full lines in Fig. 2 to the position shown in dotted lines in that figure. The latching lug with its two shoulders passes under latch 20 until latch shoulder 21 drops over lug shoulder 23. When the parts reach this position the four segments are still loose upon the pipe, but the amount of looseness or back-off allowed segment 16 by the interaction of shoulder 41 and part 42 is not great enough that this segment, carrying the latch, can back off so far that latch shoulder 21 will not drop over lug shoulder 23. In describing the relative positions of the stops, it will be well first to refer to Fig. 1. In this figure the tongs are closed to the size of pipe P. In this position it will be seen that latch shoulder 21 would theoretically just barely drop over lug shoulder 23 if segment 16 could not back off. But in applying the tongs to a pipe they must, of course, be applied loosely; and the inner circumference of the four segments is increased by throwing handle 10 from the position shown in Fig. 1 to the position shown in Fig. 2. In other words, by so moving the handle, all four segments are loosened around the pipe, or as I might say, backed off from the pipe. Thus, when handle 10 reaches stop 40, a certain definite amount of loosening or circumferential expansion of the four segments has been effected. Now, speaking in a general way, (although there are some minor considerations that vary this somewhat) the amount by which the end of segment 16 can individually move circumferentially of the pipe, when it backs away from the pipe under limitation of stops 41 and 42, must be less than the total amount of circumferential expansion that can be given all the segments by the specified movement of the handle from the position of Fig. 1 to that of Fig. 2. Now, stop 40 limits such movement of the handle relative to the segments, and stop parts 41 and 42 limit the amount of back-off movement of segment 16 when the latch is not engaged. The relationship of limited movements thus above described is such as will always cause latch shoulder 21 to be held in such a position that it will drop freely over lug shoulder 23 when the tongs are being applied to the smaller sized pipe. And these limited movement relationships are in practice preferably so made that latch shoulder 21 has plenty of freedom (as indicated in Fig. 2) in dropping over lug shoulder 23.

Now, when the device is applied to a larger-sized pipe, or to a collar C for instance of the pipe P, the latch will then engage with lug shoulder 22. Fig. 3 shows the tongs closed about such collar C with handle 10 in such a position so as to constrict the four segments about the collar. Fig. 4 shows the tongs in the act of being so applied. Here handle 10 is up against stop shoulder 40 as before, and part 42 of segment 16 has backed up against stop shoulder 41 as before. Segment 17 has been moved in as far as it will move, and latch shoulder 21 has just dropped over lug shoulder 22. But in this position of the parts, segment 17 cannot be moved in far enough to make latch shoulder 21 drop over the second lug shoulder 23. That it cannot do this is due to the fact that segment 16 is allowed to back away from the pipe far enough to keep latch shoulder 21 from reaching lug shoulder 23. In practice segment 16 will always be backed away to its limit by the action of the latch lug pushing against the latch. Now, I have previously said that the amount by which segment 16 can back away from its latching position must be less than what may be called the amount of circumferential loosening of the tongs as a whole about the pipe by throwing handle 10 to its back-off position; and this is true of the arrangement both as applied to the small-sized and the larger-sized pipe. But at the same time, segment 16 must be allowed to back off to some extent with relation to segment 14 so as to allow at least a small amount of free action between the two segments when they are tightened down upon the pipe; and in applying the tongs to a larger-sized pipe, that back-off of segment 16 is also desirable to keep latch shoulder 21 from going on and dropping over the second lug shoulder 23. This is particularly true in tongs of certain sizes where the amount of back-off looseness (the total increase in circumferential size) of the four segments due to back-off movement of the handle is greater than the circumferential distance or spacing between the two lug shoulders 22 and 23. Thus, where such general back-off expansion is greater than the distance between those lug shoulders, segment 16 must be allowed an individual back-off movement that is, generally speaking, greater than the difference between the back-off effect of the handle movement and the distance between lug shoulders 22 and 23. Or, as it may be otherwise expressed, the distance between adjacent latching shoulders is greater than the difference between (a) the circumferential expansion of the segment assembly at the handle due to back-off movement of the handle, and (b) the circumferential movement of the outer end of segment 16 in its backing-off movement. The three distances being thus interrelated, it will be seen that if (b) is made less then (a) will also be decreased, the shoulder spacing remaining the same. And if (b) were made to approach zero (if the individual backing-off of segment 16 were made very small, or practically none at all, with relation to segment 14) then the condition would be that (a), the circumferential expansion by reason of backing off of the handle, must be less than the distance between latching shoulders. As the distance between latching shoulders may be small in some cases it is then desirable to have (b) fairly large in order that (a) may be large enough to allow considerable loose freedom of the tongs when being applied to a pipe. But where the shoulder spacing is large, (b) can be made small and, except for the advantage of having a number of flexibly connected segments to contact with the pipe, can be made to approach zero, or be quite zero; and then (a) becomes simply smaller than the shoulder spacing.

While I have described a preferred and specific form of my invention with some degree of particularity, it will be understood that I have done so in order to make my invention clear by a full understanding of one specific form thereof; and have not done so for the purpose of limiting the invention.

Having described a preferred form of my invention, I claim:

1. In a pipe tongs, a handle and two independent pipe encircling elements pivotally connected thereto so that movement of the handle in one direction circumferentially constricts the elements about the pipe and movement in the other direction circumferentially expands the elements to back them off from the pipe, one of said elements being made up of a pair of segments one of which is pivoted to the handle and the other pivoted to the handle-pivoted segment, stop means acting between the handle and the handle-pivoted segment and stop means acting between the two segments to hold the two segments loosely up to the pipe when the handle is in back-off position; the amount of loose movement, circumferentially about the pipe, allowed the end of the second mentioned segment by said stop means, when the handle is in back-off position, being less than the whole circumferential expansion given the elements by backing off movement of the handle; and means to detachably connect the outer ends of the two elements together to hold the elements about the pipe.

2. In a pipe tongs, a handle and two independent pipe encircling elements pivotally connected thereto so that movement of the handle in one direction circumferentially constricts the elements about the pipe and movement in the other direction circumferentially expands the elements to back them off from the pipe, one of said elements being made up of a pair of segments one of which is pivoted to the handle and the other pivoted to the handle-pivoted segment, stop means acting between the handle and the handle-pivoted segment and stop means acting between the two segments to hold the two segments loosely up to the pipe when the handle is in back-off position; the amount of loose movement, circumferentially about the pipe, allowed the end of the second mentioned segment by said stop means, when the handle is in back-off position, being less than the whole circumferential expansion given the elements by backing off movement of the handle; and automatic latching means to connect the free ends of the two elements when the other one of said elements is closed to position around the pipe.

3. In a pipe tongs, a handle and two independent pipe encircling elements pivotally connected thereto so that movement of the handle in one direction circumferentially constricts the elements about the pipe and movement in the other direction circumferentially expands the elements to back them off from the pipe, one of said elements being made up of a pair of segments one of which is pivoted to the handle and the other pivoted to the handle-pivoted segment, stop means acting between the handle and the handle-pivoted segment and stop means acting between the two segments to hold the two segments loosely up to the pipe when the handle is in back-off position; the amount of loose movement, circumferentially about the pipe, allowed the end of the second mentioned segment by said stop means, when the handle is in back-off position, being less than the whole circumferential expansion given the elements by backing off movement of the handle; and automatic latching means to connect the free ends of the two elements when the other element is closed to position around the pipe, said latching means embodying a spring-actuated latch member on one of the elements and a lug member on the other element, one of said members having a plurality of circumferentially spaced latch shoulders so that the two members may interengage to latch the elements around pipe of different sizes, the circumferential distances between adjacent latch shoulders being greater than the difference between (a) the circumferential expansion given the elements by backing-off movement of the handle and (b) the circumferential loose movement of the end of the second mentioned segment.

In witness that I claim the foregoing, I have hereunto subscribed my name.

ROBERT ADAMS.